Sept. 3, 1957      E. S. KARSTENS      2,804,692
ELECTRIC MICROMETER ULTRA PRECISION LEVEL
Filed March 8, 1954      2 Sheets-Sheet 1
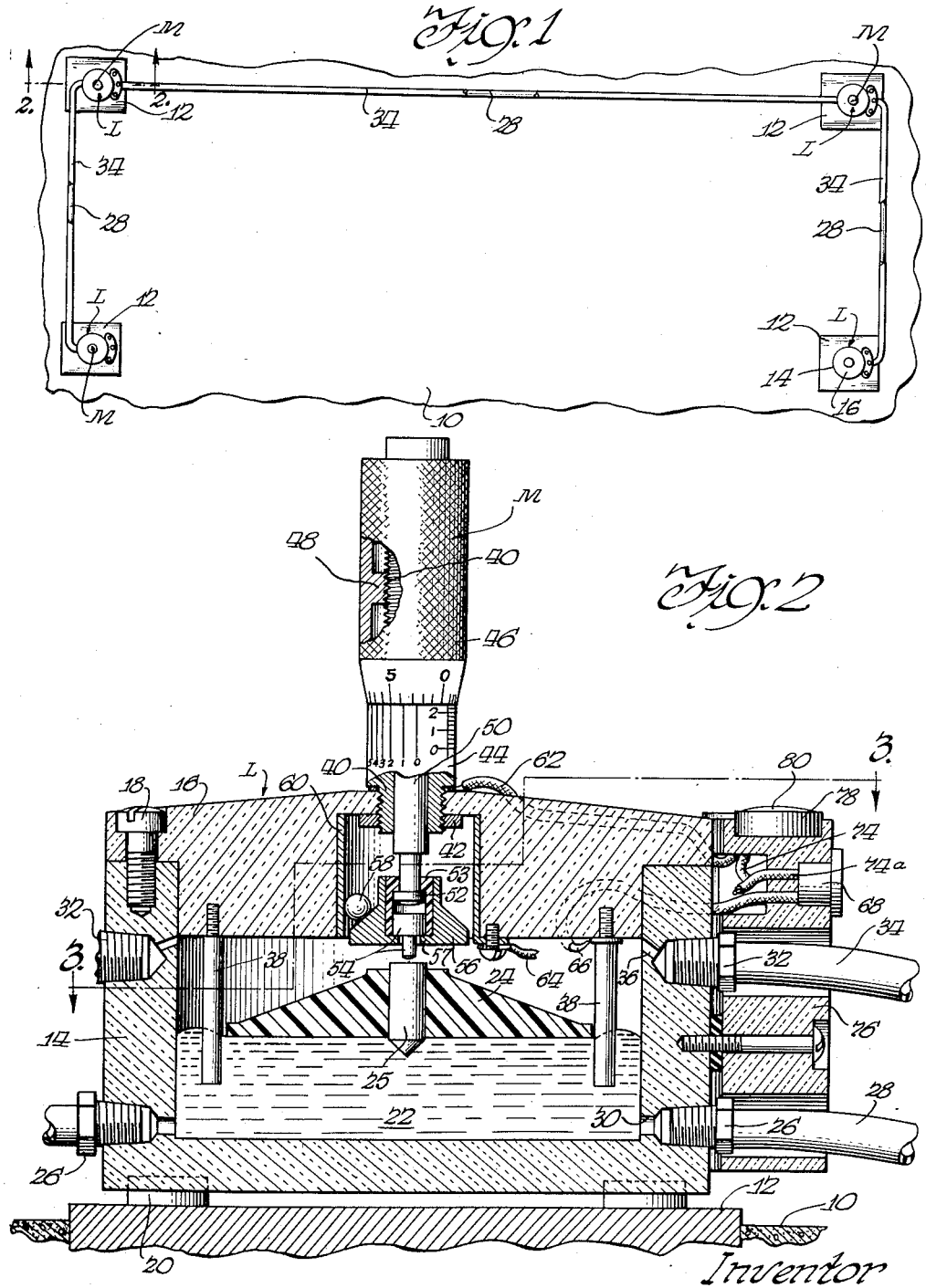
Inventor
Edward S. Karstens
by Bair, Freeman & Molinare
Attys.

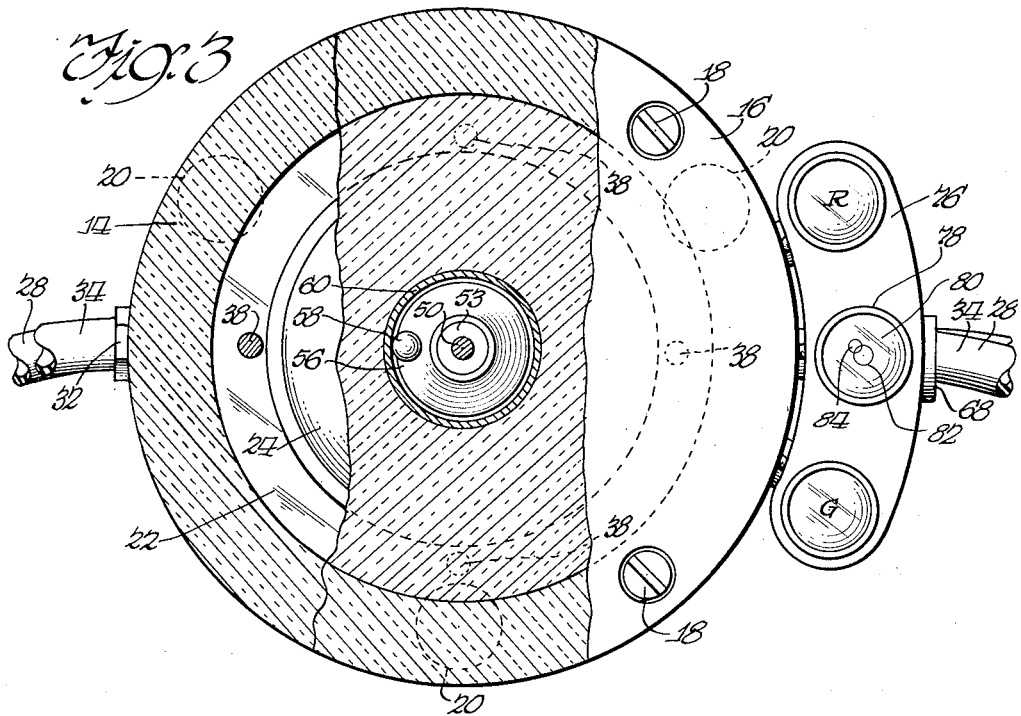
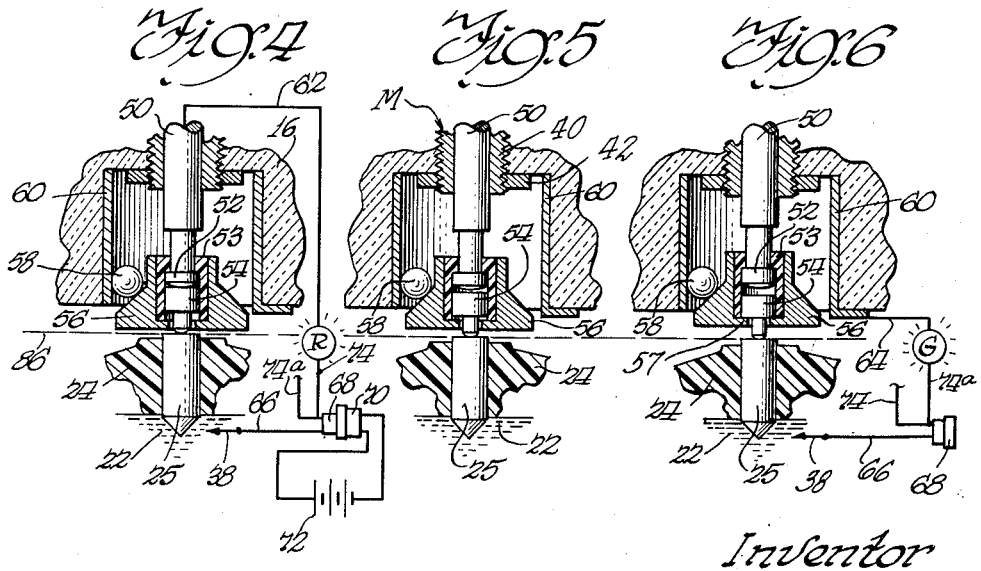

United States Patent Office 2,804,692
Patented Sept. 3, 1957

2,804,692

ELECTRIC MICROMETER ULTRA PRECISION LEVEL

Edward S. Karstens, Davenport, Iowa

Application March 8, 1954, Serial No. 414,581

2 Claims. (Cl. 33—209)

This invention relates to a level that can be used for leveling sole plates for machinery such as lathes, milling machines and rolling mills, and for all types of leveling operations, especially where precision is desired or necessary.

Spirit levels (with or without straight edges) have been the standard tools of leveling heretofore used. The method of leveling by means of spirit levels has many limitations and lacks ultra precision because the bubble in the level must travel in a bent tube which is high at the center and it is difficult to tell the exact position of the bubble within limits less than a few thousandths of an inch. It is quite important in many leveling operations, particularly in rolling mills, to be sure that the sole plates on which the mill is mounted are all exactly level within at least one or two tenths of a thousandth of an inch.

One object of my invention, therefore, is to provide an ultra precision level having micrometric means for determining the out-of-level condition and which preferably includes an electric signaling means to simplify the sensing operation of the micrometer with respect to the leveling unit.

Another object is to provide a precision level of the character disclosed wherein a number of leveling units are each comprised of a housing that provides a closed chamber, liquid being provided in the chamber and flexible conduit connections being provided between the housings so that the liquid can seek its level in all the housings, after which micrometric means is used to sense the level of the liquid and thus determine whether the housings are level relative to each other or how much out of level they are within a ten-thousandth of an inch.

Still another object is to provide a practical and stable liquid leveling unit wherein mercury is used as the liquid and a micrometer of the adjustable spindle type is provided mounted on the housing, an electric signaling circuit being connected therewith to signal the contact of the spindle with the mercury or with a float that rides on the mercury and thus indicates its level.

A further object is to provide primary and secondary contacts interposed between the float and the micrometer spindle, and electric signaling means consisting of separate light circuits connected with the primary and secondary contacts to indicate with precision the relation of the spindle to the float or mercury.

Still a further object is to provide magnets on the leveling units for properly seating them on sole plates or the like to be leveled, and spirit levels to serve as rough leveling instrumentalities on each of the leveling housings.

With these and other objects in view, my electric micrometer ultra precision level consists in the construction, arrangement and combination of the various parts thereof, whereby the objects contemplated are attained, as hereinafter more fully set forth, pointed out in my claims and illustrated in the accompanying drawings, wherein:

Fig. 1 is a plan view of a leveling system including four of my leveling units on four sole plates, such as those imbedded in concrete to support a lathe or the like.

Fig. 2 is a vertical sectional view on the line 2—2 of Fig. 1 showing one of my ultra precision leveling units enlarged to approximately full size.

Fig. 3 is a horizontal sectional view on the line 3—3 of Fig. 2 to illustrate details.

Fig. 4 is a sectional view similar to a portion of Fig. 2 showing the parts in a different position during the leveling operation; and Figs. 5 and 6 are similar sectional views showing still other positions during the leveling operation.

On the accompanying drawings, I have used the reference numeral 10 to indicate a floor of concrete or the like in which sole plates 12 have been embedded. One of my leveling devices L is placed on each of the sole plates to determine their relative elevation after which they may be trimmed down so that they are level, or they may be temporarily set and leveled up and then the concrete poured around them, depending on the leveling technique of the user which forms no part of my present invention.

My invention, on the other hand, consists of the leveling unit, two or more of which may be provided as required and which will now be described.

Each of my leveling units L comprises a housing 14 and a cover 16 which may be secured together as by cap screws 18 to provide a closed chamber. The elements 14 and 16 may be made of glass or transparent plastic, or of non-transparent metal or insulating material as desired. Magnets 20 (preferably three) are embedded in the bottom of the housing 14 for efficient mounting of the housing on the sole plate 12 as shown in Fig. 2 in such manner that it will remain stationary relative thereto.

Within the housing 14—16 is a quantity of liquid 22 (preferably mercury). A float 24, which may be made of plastic material or the like, is resting on the mercury 22 and a metallic insert 25 therein serves to conduct electricity from the mercury to a signaling system as will hereinafter appear. The float 24 is guided by posts 38 depending from the cover 16.

The several housings 14—16 are connected together by flexible conduits 28, the ends of which are mounted on fittings 26 which communicate by means of openings 30 to the interiors of the housings 14—16 and thus the mercury 22 is conducted from one housing to the other so as to seek its level in the various housings after they have been mounted on the sole plates and a short time given for the mercury to stabilize its level in the housings. Air conduits 34 are also connected between the housings, the ends of the conduits being mounted on fittings 32 that communicate with vents 36 to the interiors of the housings so that a closed system against the entrance of dust and other foreign matter is provided. This arrangement provides equalization of pressures throughout the system so that the mercury therein can seek its level without being retarded in any way.

I provide a micrometric sensing unit M (Fig. 2) for each of the leveling units L which will now be described. The unit M is a micrometer of usual construction having a barrel 40 secured to the housing cover 16 as by a lock nut 42. The barrel 40 is threaded for the spindle nut 48 which is usually part of the thimble 46, the micrometer spindle being shown at 50. Rotation of the thimble 46 raises and lowers the spindle 50 in an obvious manner.

The lower end of the spindle 50 is provided with an enlarged head 52 which serves as a secondary contact and an insulating sleeve 53 is suspended thereon and carries a metallic spool 56. The cross-section of the spool 56 is such that it has an inturned flange 57 to support a primary contact 54 having a reduced stem depending therefrom for contact with the insert 25 as will hereinafter appear during the description of the operation of the device. The spool 56 is located within a sleeve 60 that serves as a circuit connection by reason of a metallic ball 58 floating between the sleeve and the spool.

Circuit connections are provided in the form of wires 62, 64 and 66 with the micrometer barrel 40 (and thereby the spindle 50), the sleeve 60 and one of the posts 38 respectively for purposes which will hereinafter appear.

Referring to Figs. 4 and 6, it will be noted that the wire 62 connects with a red signal light bulb R and the wire 64 connects with a green signal light bulb G. These bulbs are connected by wires 74 and 74a to one side of a jack 68, the other side of which is connected by the wire 66 to the post 38. The jack 68 has a plug 70 therein for supplying current thereto from a suitable source of current supply such as a battery 72 shown diagrammatically in Fig. 4.

The signal bulbs R and G may be mounted in a sub-housing 76 secured to the housing 14 as shown in Figs. 2 and 3 and the sub housing preferably has a spirit level 78 mounted thereon to serve as a rough level for leveling up the upper surface of the sole plate 12. For this purpose the spirit level 78 is covered by a transparent cover 80 on which is scribed a circle 82 around the center, the under surface of the element 80 being a shallow cone and a bubble 84 being provided which indicates levelness within about .001" when it is centered with respect to the scribed circle 82.

*Practical operation*

The sole plates 12 may be leveled by suitable blocking, using four of the leveling units L as shown in Fig. 1, the concrete 10 may then be poured and thereafter the levelness of the sole plates may be checked using my leveling units. On the other hand the sole plates may be embedded in the concrete approximately level and after the concrete has hardened may be machined to level relation, using my leveling units before and during the machining operations. In both cases, the leveling operation is substantially as follows:

The connecting conduits 28 should be slightly below the openings 30 so that air is not trapped in them. The mercury is given time to meet room temperature and becomes stabilized at equal levels in all of the units L.

The micrometer thimble 46 on one of the units is then screwed downwardly (rotated clockwise) until the red light comes on. For instance, the initial position might be as shown in Fig. 2 and the operator will rapidly screw the thimble downwardly, during which operation the primary contact 54 will contact the insert 25 as shown in Fig. 6 which will energize the green light G but immediately de-energize it because the spool 56 moves on downwardly out of contact with 54 as shown in Fig. 5. About .005" further movement after 54 contacts 25 will cause the secondary contact 52 to engage the primary contact 54 as here illustrated and energize the red light R. The chances are the green light will be energized sufficiently long to be noticed but it is a warning that only about .005" further movement is needed to bring the red light on. This .005" is represented in Fig. 2 by the space between 52 and 54 (here shown exaggerated) and may be any desirable amount, but preferably small, so as to require only a partial turn of the thimble 46 to bring the green light on again as will now be described.

Once the red light is energized, the rotation of the thimble 46 is reversed and will then break the circuit of the red light because of 52 ceasing to contact with 54 as in Fig. 5, whereupon, by slow and careful rotation counterclockwise, the micrometer spindle 50 is finally raised to the position of Fig. 6 with the primary contact 54 just contacting the inturned flange 57 of the spool 56 and thereby energizing the green light. It is obvious that any further counterclockwise rotation of the thimble 46 will break the green light circuit so that the operator can "feel for the light" by gently oscillating the thimble until the green light stays on. At that time, the reading of the micrometer can be taken. The micrometer is preferably of the vernier or some comparable type so that it can be read to .0001" (the reading in Fig. 2 being 0.2493).

The micrometer on each of the other leveling units L is then likewise read and the difference in reading is the difference in elevation between the sole plates 12. The sole plates can then be reblocked before the concrete 10 is poured or, if checking is being done after it is poured and set, the high sole plates can be machined down the difference indicated by the micrometers and the level again checked with assurance that precision within .0001" is possible of attainment.

During initial manufacture, the micrometer M can be adjusted on each leveling unit to a standard reading with respect to the plane of the lower surfaces of the magnet 20 and thus all the various units are coordinated in relation to each other. The .005" clearance between 52 and 54 before mentioned may be varied as desired, but, in general, the spacing mentioned is satisfactory for the majority of uses to which the leveling system will be put.

I have disclosed only one type of micrometric sensing mechanism for checking the elevation of the liquid level or the float thereon in the various units, whereas others may be used in its place. The units are connected together for free flow of the liquid through the conduits 28 and the air conduits 34 prevent unequal pressures in the units and, therefore, erratic action. This arrangement encloses the entire system against the entrance of any foreign matter and provides a degree of accuracy heretofore unattainable with spirit levels and straight edges.

While I have disclosed an electric means for accurately sensing the position of the micrometers in relation to the surfaces being tested, other means may be provided for this purpose but the electric signaling means is a substantial convenience to secure a degree of precision not possible with visual observance of the position of the spindle 50 in relation to the float 24 as seen through the cover 16 for the housing 14.

Some changes may be made in the construction and arrangement of the parts of my electric micrometer ultra precision level without departing from the real spirit and purpose of my invention. It is therefore my intention to cover by my claims any modified forms of structure or use of mechanical equivalents which may be reasonably included within their scope.

I claim as my invention:

1. In an electric micrometer ultra precision level, a plurality of leveling units, each of said units including a housing providing a closed chamber, mercury therein, a float on said mercury, flexible conduit connections between said units, both below and above the level of the mercury therein, and means for sensing the elevation of the float in each of said units comprising a micrometer mounted on said housing and having an adjustable spindle adapted to contact said float by means of a member suspended from said spindle in spaced relation therebelow and upwardly movable relative thereto, the lower end of said spindle and said movable member constituting secondary and primary contacts respectively, and separate electric signaling circuits connected with said primary and secondary contacts, whereby upon lowering of said micrometer spindle said movable member will be first engaged by said float and supported thereby for movement into engagement with said spindle lower end, thereby enabling said circuits to indicate with precision the relation of said spindle to said float.

2. A micrometric ultra precision level comprising a plurality of leveling units, each of said units including a housing providing a closed chamber, a spirit level for rough leveling supported by said housing, liquid in said housing, a float on said liquid, flexible conduit connections between said units, and means to sense the level of the liquid in each of said units comprising a micrometer mounted on said housing and having an adjustable spindle adapted to contact said liquid by means of said float and a member suspended from said spindle in spaced relation therebelow and upwardly movable relative thereto, the lower end of said spindle and said member constituting secondary and primary contacts respectively, and dual electric light bulb means connected with said primary and secondary contacts to indicate with precision the relation of said spindle to said liquid.

References Cited in the file of this patent

UNITED STATES PATENTS

| | | |
|---|---|---|
| 1,395,133 | McNerney | Oct. 25, 1921 |
| 2,292,968 | Peters | Aug. 11, 1942 |
| 2,438,758 | Leach | Mar. 30, 1948 |
| 2,553,668 | Morello | May 22, 1951 |
| 2,557,021 | Williams | June 12, 1951 |

FOREIGN PATENTS

| | | |
|---|---|---|
| 185,806 | Great Britain | Sept. 21, 1922 |
| 548,648 | France | Oct. 28, 1922 |
| 635,090 | Germany | Sept. 10, 1936 |